Patented Feb. 1, 1949

2,460,334

UNITED STATES PATENT OFFICE 2,460,334

PROCESS OF MAKING BONDED STRUCTURES

Martin J. Buerger, Lincoln, and Edward Washken, Cambridge, Mass., assignors to Owens-Illinois Glass Company, a corporation of Ohio No Drawing. Application March 27, 1946,
Serial No. 657,628

8 Claims. (Cl. 18—59)

This invention relates to the preparation of products consisting of metal and non-metallic mineral compounds which are characterized by being tightly bonded together.

In particular, this invention relates to a process of bonding metal to ceramic-like ware which is composed essentially of plastically deformable crystals under controlled conditions of time, temperature, and pressure without the use of adhesives or cements.

Although many attempts have been made in the past to bond metal to ceramic ware, such of these efforts as have been successful have been confined to particular materials which have matching characteristics. For instance, if the coefficient of expansion of glass is matched with that of a metal, a tight bond may be obtained betweeen the two. Unfortunately the number of metals having the same coefficient of expansion as glass are limited to platinum, tungsten and certain iron alloys. Metals cannot be directly bonded to clay products because the shrinkage of clay and clay-containing ceramics is so great that an adequate bond cannot be obtained if the two are fired together. This being the case, metals have been incorporated into fired ceramic materials and bonded with an adhesive such as Bakelite or sodium silicate, or other such resins and cements. Although such products are suitable for some purposes, they involve an extra operational step (that of applying the cement), and for other purposes they are unsuitable because the binding material does not have the proper physical, chemical, and/or electrical properties required. Resins such as polydichlor styrene with silica glass as a filler to hold metal inserts in place have been employed. These products have required about 20% by weight of resin and are not stable at high temperatures.

It is an object of this invention to bond ceramic-like materials composed essentially of plastically deformable crystals to metal products without the aid of cements or adhesives.

It is a further object to produce a metal-ceramic-like bonded composition which is stable to heat.

Other objects will appear in the following disclosure:

In order to understand more fully the process by which these objects are accomplished the following general discussion of the properties of metals and plastically deformable ceramic-like materials is given.

As disclosed in U. S. Patent 2,362,430 to Martin J. Buerger, one of the present applicants, there exists a group of materials, crystals of which are "plastically deformable." The plastic deformability of crystals may be determined in accordance with the procedure set forth in Neues Jahrb. Mineral, Geol. Beil., Bd. 45, 121-48 (1921) by K. Veit. Briefly stated, this procedure involves the placing of a crystal of the substance to be examined within a mass of an appropriate supporting and enveloping medium such as powdered sulfur, and applying sufficient pressure at normal or raised temperature (the pressure and temperature being adjusted to the material treated) to cause a change in shape of the crystal. If the crystal is deformed by the gliding of its constituent parts along the gliding planes of the crystal, without rupture, it is "plastically deformable." If, however, under the conditions imposed, the crystal breaks so that it may even be shattered to a powder, it is not plastically deformable. Again, some crystals, due to lack of proper gliding planes in their structure, are unaffected even by the most extreme conditions of this testing procedure, and hence are also not plastically deformable. Examples of plastically deformable materials include calcium fluoride, magnesium oxide, aluminum oxide, and anhydrite.

The plastically deformable material to be employed is finely powdered, the powder placed in a mold, compressed until it has a specific gravity of at least 75% of theoretical and preferably and more generally between 90% and 100%, removed and then heated to the proper temperature. The heating must be below that temperature which will cause substantial recrystallization and crystal growth. It has been found that the pressures employed cause crystal deformation as well as dense packing of the material. Upon heating the article becomes stronger and may be handled.

The strengthening of the article is due to a type of sintering action which takes place. Sintering, as used here, refers to a bonding action that takes place between the grains of compressed material. It is not known what the mechanism of sintering is, but it may be a cold welding process. In any case it is known that such sintering or bonding does take place when the article is heated below the point at which recrystallization begins. The minimum temperature of heating the material is not critical, because increasing strengths are experienced with increasing temperatures for a fixed period of time. The time of heating is not critical except that increasing times of heating at a given temperature increase the strength of the article. Heating the article sufficiently to cause substantial crystal growth causes a small amount of shrinkage to take place, but this shrinkage is sufficient to crack the article if it includes a solid metal insert. Heating below this temperature does not cause appreciable shrinkage but makes the article strong so that the final article consists of a metal insert tightly bonded into an uncracked ceramic-like piece. The expansion and contraction of the metal and the non-metallic materials due to the differences in co-efficients of expansion are not great enough at the temperatures encountered during the process of preparing the article to interfere with securing a tight bond.

The essential feature of the invention is, therefore, the heating of the metal and non-metallic molded piece to a temperature low enough so that the effects of contraction and shrinkage are substantially avoided and yet high enough to cause sintering as described above sufficiently to tightly bond the article. Experimentally it has been determined that the heating should be to a temperature of at least about 1000° F. It is preferred, however, to heat the composite body to just below the temperature which will cause appreciable crystal growth. By such procedure sintering is more quickly accomplished and the product appears to be stronger than when a lower temperature is used. The presence of the metal insert usually requires that the heating be carried out in a non-oxidizing atmosphere such as, for instance, in a vacuum, in an atmosphere of hydrogen, or in an atmosphere of carbon monoxide, in order to avoid oxidation of the metal. If it is desired to remove any strain that may be present, (strains may be readily determined by known X-ray techniques), it is only necessary to heat the article for a sufficient length of time. Generally the time varies from 20 minutes to three hours depending upon the composition and the temperature employed. The strain may be relieved either during the preparation of the article or during a subsequent heating step.

The reason for the bonding effect described above is not known.

The process of this invention will be more fully understood by the following description and examples:

A round copper pin of solid metal is prepared. Powdered calcium fluoride (fluorite), all of which passes through 170 mesh, is placed in a mold for forming a disk, and the pin inserted in the center. The powder with the inserted pin is then subjected to a pressure of 40 t./in.$^2$ which is sufficient to deform the crystals. When removed from the mold at this point the ceramic is weak, though its "green" strength is sufficient for handling. Since the critical point where substantial crystal growth and recrystallization begins in calcium fluoride is at a temperature of around 1700° F., the formed structure is heated below that temperature but reasonably close to it, say 1650° F., for a sufficient time to cause the bonding due to a sintering together of the grains of fluorite. The product is strong and devoid of cracks, and the metal insert is tightly held.

The coefficient of thermal expansion of calcium fluoride over a range of temperatures is about the same as that of a 14% Mn–86% Fe alloy. Accordingly, to illustrate a contrasting procedure, a solid insert of that composition was imbedded in fluorite and the fluorite molded around it. The mold was designed to press a wafer of material ½" in diameter containing a round metal insert $\frac{1}{16}$" in diameter of the said alloy. Enough calcium fluoride was incorporated to produce a finished ceramic-like piece about ⅜" in thickness. The composition was heated in dry hydrogen for 3 hours at 1860° F. In spite of the similarity of coefficients of expansion, radial cracks developed which rendered the product unfit for use.

However, it may be seen by the following examples that by heating the article to a temperature below that at which substantial crystal growth occurs, difficulty of cracking may be avoided, even when the coefficients of expansion of the ceramic-like material and the metal are quite different. The molding and other procedures are substantially the same as disclosed in the above-mentioned Patent 2,362,430 to Martin J. Buerger.

*Example I*

A solid round copper insert $\frac{1}{16}$" in diameter was prepared. Fluorite reduced so that 100% passed through a 170 mesh screen was placed in a mold with the metal insert and compressed with 50 tons per square inch pressure. The resulting article was removed and heated to 1700° F. in a vacuum for 3 hours. The final product was firm and not cracked, and the metal insert was firmly imbedded.

*Example II*

An iron insert of the same size and shape as the copper insert described above was prepared. The same mold and general procedure was followed as in Example I. A pressure of 40 tons per square inch was employed and the resulting product was heated in dry hydrogen at 1700° F. for 2 hours. The resulting product was uncracked, and strong. The iron insert was tightly bound.

*Example III*

Fused magnesium oxide 100 mesh and finer was pressed in the mold around an iron insert by the same procedure as described in Example I. The molded product was heated to 2000° F. for 3 hours. A tight seal was accomplished and the piece showed no cracks.

The many uses for this metal-to-ceramic bonded article include lead-in electrodes, mechanical supports for ceramic which will not loosen up on use, sealed transformers, and moving mechanical parts where electrical insulation is desired.

*Example IV*

A copper cylinder .75 in. long, .75 in. external diameter, and .625 in. internal diameter was filled with finely divided calcium fluoride (170 mesh or finer). The fluorite was compressed at 40 t./in.$^2$, and then heated in a vacuum for 2 hours at 1650° F. The insert was tightly bonded to the copper cylinder.

The non-metallic element of the composition may be an insert in a ring of solid metal. The procedure involves the same steps and temperatures outlined above except that a ring of metal is placed in the mold rather than a pin. An obvious variation of this includes it as an article having alternate concentric metal and non-metallic sections. Or, alternatively, curved or otherwise-shaped solid metal pieces may be bonded to the non-metallic material by the procedures described above to form any one of a wide variety of shapes. The insert must be confined, though by "confined" is not meant that it must be completely surrounded. By this process flat pieces cannot be tightly secured to each other; there must, as stated above, be some confining to hold the peices securely together. Thus by "insert" is meant that one of the elements may extend completely around the circumference of the other element, or may extend only sufficiently to prevent motion in all but one direction (e. g. up and down).

The procedures already described herein are effective, as already suggested, with other metals and alloys, e. g. brass, silver, nickel, etc., and with other plastically deformable non-metallic substances such as anhydrite, aluminum oxide, etc., it being necessary merely to adjust the pressure of molding and the temperature of firing in the manner already herein set forth in detail.

It has been found in practice that the degree of fineness of the non-metallic material is not critical as long as such material is reduced to a reasonable fineness to get precision of molding. The fine particles employed may be obtained in any suitable manner. They may result from mechanically reducing larger crystals of the material, or may be produced by precipitating from solution, or by other known means such as volatilization. From practical considerations, mechanical reduction is preferred.

The metal insert may be any useful metal or metal alloy having a melting point above that temperature to which it must be heated during the process of the present invention. Certain alloys, and particularly certain of those iron and copper alloys having special characteristics such as resistance to corrosion, are particularly useful. As a practical matter, the metals suitable for this purpose will inherently have high enough melting points so that they are not affected by the preferred minimum heating temperature of about 1000° F.

We claim:

1. The process of forming a structure consisting of an inorganic non-metallic compound portion firmly bonded to a metallic portion, one portion being an insert in the other, which comprises pressing into intimate contact with each other a solid metal shape and a finely-divided non-metallic inorganic plastically deformable crystalline compound in the absence of additional binder material under sufficient pressure to plastically deform the crystals of said non-metallic compound and to impart thereto a density equal to at least about 75% of its true density, and then heating in an inert atmosphere to a temperature above that at which bonding takes place and below that at which any substantial crystal growth of the deformed crystals of the non-metallic plastically deformable crystalline material begins.

2. The process of forming a structure consisting of an inorganic non-metallic compound portion firmly bonded to a metallic portion, one portion being an insert in the other, which comprises pressing into intimate contact with each other a solid metal shape having a melting point above 1000° F. and a finely-divided non-metallic inorganic plastically deformable crystalline compound in the absence of additional binder material under sufficient pressure to plastically deform the crystals of said non-metallic compound and to impart thereto a density equal to at least about 75% of its true density, and then heating in an inert atmosphere to a temperature of at least about 1000° F. and above that at which bonding takes place but insufficient to cause any substantial recrystallization and crystal growth of the non-metallic plastically deformable compound and for a sufficient time to effect a firm, well-bonded product.

3. The process according to claim 2 wherein the metallic portion is copper.

4. The process of forming a structure consisting of a calcium fluoride portion firmly bonded to a copper portion, one portion being an insert in the other, which comprises pressing into intimate contact with each other a solid copper portion and finely-divided crystalline calcium fluoride in the absence of additional binder material under sufficient pressure to plastically deform the crystals of said calcium fluoride and to impart thereto a density equal to at least about 75% of its true density, and then heating the resulting structure in an inert atmosphere to a temperature between 1000° F. and 1700° F. for a sufficient time to effect a firm, well-bonded product.

5. The process according to claim 2 wherein the non-metallic compound is calcium fluoride.

6. The process according to claim 2 wherein the non-metallic compound is magnesium oxide.

7. The process according to claim 5 wherein the temperature of heating is between 1600° F. and 1700° F.

8. The process of forming a structure having a copper insert in a calcium fluoride portion, which comprises pressing into intimate contact with each other a solid copper insert and finely-divided calcium fluoride crystals in the absence of additional binder material under sufficient pressure to plastically deform said crystals and to impart thereto a density equal to at least about 90% of its true density, and then heating the resulting structure in an inert atmosphere to a temperature between 1000° F. and 1700° F. for a sufficient time to effect a firm well-bonded product.

MARTIN J. BUERGER.
EDWARD WASHKEN.

REFERENCES CITED

The following references are of record in the file of this patent:

UNITED STATES PATENTS

| Number | Name | Date |
| --- | --- | --- |
| 1,940,707 | Browne | Dec. 26, 1933 |
| 2,221,983 | Mayer et al. | Nov. 19, 1940 |
| 2,303,514 | Toepfer | Dec. 1, 1942 |
| 2,399,773 | Waintrob | May 7, 1946 |